(12) United States Patent
Marable et al.

(10) Patent No.: US 9,975,518 B2
(45) Date of Patent: May 22, 2018

(54) AIRBAG

(71) Applicant: FORD GLOBAL TECHNOLOGIES, LLC, Dearborn, MI (US)

(72) Inventors: Paul Mark Marable, Rayleigh (GB); Allen Charles Bosio, Basildon (GB); Robert William Sleath, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/279,822

(22) Filed: Sep. 29, 2016

(65) Prior Publication Data
US 2017/0088088 A1    Mar. 30, 2017

(30) Foreign Application Priority Data

Sep. 29, 2015  (GB) .................................... 1517178.8
Sep. 29, 2015  (IN) ........................... 5204/CHE/2015

(51) Int. Cl.
*B60R 21/2338*    (2011.01)
*B60R 21/00*    (2006.01)

(52) U.S. Cl.
CPC .. *B60R 21/2338* (2013.01); *B60R 2021/0048* (2013.01); *B60R 2021/23382* (2013.01); *B60R 2021/23384* (2013.01)

(58) Field of Classification Search
CPC ...... B60R 21/2338; B60R 2021/23384; B60R 2021/23382; B60R 2021/0048
See application file for complete search history.

(56) References Cited

U.S. PATENT DOCUMENTS 5,306,043 A * 4/1994 Mihm ................... B60R 21/233
280/732
5,489,119 A * 2/1996 Prescaro ............... B60R 21/233
280/730.1
5,647,609 A * 7/1997 Spencer ................ B60R 21/207
280/730.1

(Continued)

FOREIGN PATENT DOCUMENTS

DE         2152902 A1     4/1973
DE    102014204080 A1     9/2015

(Continued)

OTHER PUBLICATIONS

Great Britain Search Report dated Feb. 1, 2016 for Great Britain Application No. GB1517178.8, 5 pgs.

*Primary Examiner* — Drew J Brown
(74) *Attorney, Agent, or Firm* — Frank A. MacKenzie; Brooks Kushman P.C.

(57) ABSTRACT

An airbag assembly for a vehicle is provided. The airbag assembly comprises an airbag and an inflator to inflate the airbag when deployed. The airbag comprises one or more tethers. The one or more tethers are coupled to an outer wall of the airbag at a first end of the tethers. The tethers are configured to form one or more pleats in the outer wall of the airbag when the airbag is fully inflated. The one or more tethers are coupled to the outer wall at a location such that the one or more pleats at least partially unfold during an impact between an occupant of the vehicle and the airbag and reduce a tension in a portion of the outer wall of the airbag when inflated and during an initial period of an impact between an occupant of the vehicle and the airbag.

20 Claims, 4 Drawing Sheets

(56) References Cited

U.S. PATENT DOCUMENTS

| | | | |
|---|---|---|---|
| 6,536,800 B2* | 3/2003 | Kumagai | B60R 21/231 280/730.1 |
| 6,918,614 B2 | 7/2005 | Ryan | |
| 7,360,789 B2* | 4/2008 | Bito | B60R 21/205 280/729 |
| 7,396,045 B2* | 7/2008 | Aranzulla | B60R 21/233 280/743.2 |
| 7,621,561 B2 | 11/2009 | Thomas et al. | |
| 7,784,828 B2 | 8/2010 | Matsu et al. | |
| 8,684,407 B2* | 4/2014 | Fischer | B60R 21/2338 280/739 |
| 2002/0175511 A1* | 11/2002 | Dunkle | B60R 21/233 280/743.2 |
| 2008/0174094 A1* | 7/2008 | Bito | B60R 21/2338 280/739 |
| 2009/0115176 A1* | 5/2009 | Reiter | B60R 21/231 280/743.2 |
| 2014/0015230 A1* | 1/2014 | Le Norcy | B60R 21/2338 280/728.1 |
| 2014/0246846 A1* | 9/2014 | Anderson | B60R 21/233 280/743.2 |
| 2015/0217716 A1* | 8/2015 | Anderson | B60R 21/2338 280/729 |

FOREIGN PATENT DOCUMENTS

| | | |
|---|---|---|
| EP | 2145803 A1 | 1/2010 |
| GB | 2498439 A | 7/2013 |
| JP | H07205750 A | 8/1995 |

* cited by examiner

AIRBAG

CROSS-REFERENCE TO RELATED APPLICATIONS

This application claims foreign priority benefits under 35 U.S.C. § 119(a)-(d) to GB 1517178.8 filed Sep. 29, 2015 and IN 5204/CHE/2015 filed Sep. 29, 2015, which are hereby incorporated by reference in their entirety.

TECHNICAL FIELD

The present invention relates to airbags and is particularly, although not exclusively, concerned with airbags comprising tethers configured to form pleats in the outer wall of the airbag.

BACKGROUND

When a vehicle is involved in a collision an airbag may be deployed to cushion an impact between an occupant of the vehicle and an interior object or surface, such as a steering wheel, or a window.

The airbag is inflated to form a cushion, which often has a constant pressure and constant tension over its surface. The tension in the surface of the cushion increases as the occupant impacts the cushion. The pressure and tension can be reduced by venting gas out of the cushion.

The tension in the surface of the cushion may be tailored according to the size and weight of the occupant. Smaller occupants may be cushioned more effectively by lower surface tension cushions; whereas higher surface tensions may be required to cushion the impact of larger occupants, or an occupant who is not wearing a seat belt.

SUMMARY

According to a first aspect of the present invention, there is provided an airbag assembly for a vehicle, the airbag assembly comprising an airbag and an inflator to inflate the airbag when deployed, the airbag comprising one or more tethers, wherein the one or more tethers are coupled to an outer wall of the airbag at a first end of the tethers, the tethers being configured to form one or more pleats in the outer wall of the airbag when the airbag is fully inflated, wherein the one or more tethers are coupled to the outer wall at a location such that the one or more pleats at least partially unfold during an impact between an occupant of the vehicle and the airbag, and wherein the one or more tethers reduce a tension in a portion of the outer wall of the airbag when inflated and during an initial period of an impact between an occupant of the vehicle and the airbag.

Troughs, e.g. bottoms of troughs of the one or more pleats may be formed at the locations where the first ends of the one or more tethers are coupled to the outer wall of the airbag.

The one or more pleats may be formed on the airbag above a location where a head of the occupant of the vehicle impacts the airbag.

The one or more tethers may be configured to reduce the tension in the portion of the outer wall of the airbag at and/or above the location at which the head of the occupant of the vehicle impacts the airbag.

The one or more tethers may be coupled to the airbag assembly at a second end of the tethers. For example, the one or more tethers may be coupled to the inflator at a second end of the tethers. Additionally or alternatively, the one or more tethers may be coupled to the outer wall at a second end of the tethers.

The lengths of the one or more tethers may be configured such that the outer wall of the airbag at the first end of the tethers is pulled inwards towards the second end of the tethers to form the pleats.

The one or more tethers may comprise two or more first ends coupled to the outer wall of the airbag at two or more positions. One of the positions may be lower than another of the positions when the airbag is inflated. Additionally or alternatively, one of the positions may be laterally offset from another of the positions when the airbag is inflated.

At least one of the one or more tethers may be bifurcated, e.g. substantially Y-shaped, with two or more first ends coupled to the outer wall of the airbag.

The one or more tethers may be formed from substantially the same material as the outer wall of the airbag. The tethers may be provided inside the airbag, e.g. internal to the airbag.

The airbag assembly may comprise at least two tethers, which may form at least two pleats. At least two of the tethers may form a substantially V-shaped arrangement of tethers.

The tension in the surface of the airbag may increase during an impact. The peak tension in the surface of the airbag during an impact may be substantially unaffected by the pleats and/or tethers. The maximum size of a passenger who can be cushioned by the airbag may therefore be unaffected by the inclusion of the tethers and/or pleats.

The pleats may be configured to cause a head of the occupant of the vehicle impacting the airbag to rotate forwards, e.g. such that the forehead of the occupant rotates forwards relative to the chin of the occupant. Rotation in this way may encourage flexion of the neck of the occupant rather than extension.

The pleats may be configured to reduce extension of the neck of the occupant during an impact, e.g. the pleats may prevent rearward deflection of the head of the passenger due to contact with the airbag.

The one or more tethers may be configured to reduce the tension in the portion of the surface of the airbag at and/or above the location at which the head of a smaller occupant of the vehicle would impact the airbag, for example a female in the $5^{th}$ percentile of height according to NCAP testing procedure.

The peak tension in the surface of the airbag may be configured to cushion an impact with a larger occupant.

The airbag may comprise a single chamber airbag. Alternatively, the airbag may comprise two or more chambers.

According to another aspect of the present disclosure, there is provided a vehicle comprising the airbag assembly according to a previously mentioned aspect of the disclosure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
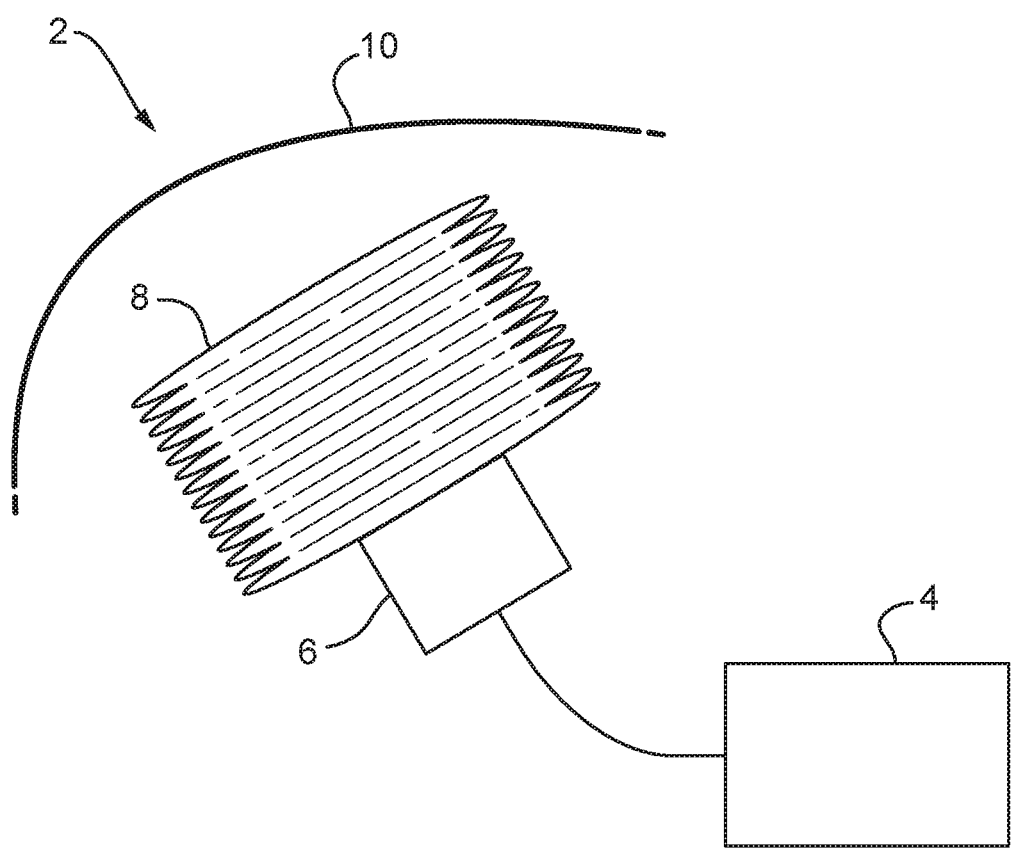
FIG. 1 shows a schematic sectional view of an airbag system for a vehicle, according to an arrangement of the present disclosure, in a pre-deployment condition.

With reference to FIG. 1, an airbag system 2 for a vehicle, according to an arrangement of the present disclosure, is described. The airbag system 2 may comprise a collision detector 4, an inflator 6 and an airbag 8. As shown in FIG. 1, the airbag system 2 may be installed within a dashboard 10 of the vehicle. Alternatively, the airbag system 2 may be installed within a steering wheel, door or roof of the vehicle, or in any other location where it may be desirable to cushion an impact of an occupant of the vehicle. Multiple airbag systems may be provided in different locations within the vehicle. As shown in FIG. 1, prior to inflation the airbag is stored within the dashboard 10 in a folded configuration.

The collision detector 4 may be configured to detect a collision of the vehicle and may determine the location and severity of the collision. The collision detector 4 may determine the direction of travel of vehicle during the impact and/or the direction of an impact against the vehicle from another body involved in the collision. The collision detector 4 may determine whether it would be beneficial to the safety of the occupant of the vehicle to deploy the airbag 8 to cushion an impact of the passenger against the dashboard 10. The collision detector 4 may also determine the timing with which the airbag should be deployed in order to most effectively cushion the impact of the passenger according to the location of the passenger relative to the airbag 8 and the location, severity and/or direction of the collision impact.

The collision detector 4 may be operatively coupled to the inflator 6. If it is determined that the airbag 8 should be inflated, the collision detector 4 may provide a signal to the inflator 6 causing it to activate and inflate the airbag 8.

The inflator 6 may comprise a pyrotechnic charge which may be detonated or rapidly combusted to produce a gas, such as nitrogen, in order to inflate the airbag 8. Additionally or alternatively, the inflator may comprise a compressed gas reservoir. The inflator 6 may release the compressed gas from the reservoir into the airbag 8 in order to inflate the airbag.

Figure 2:
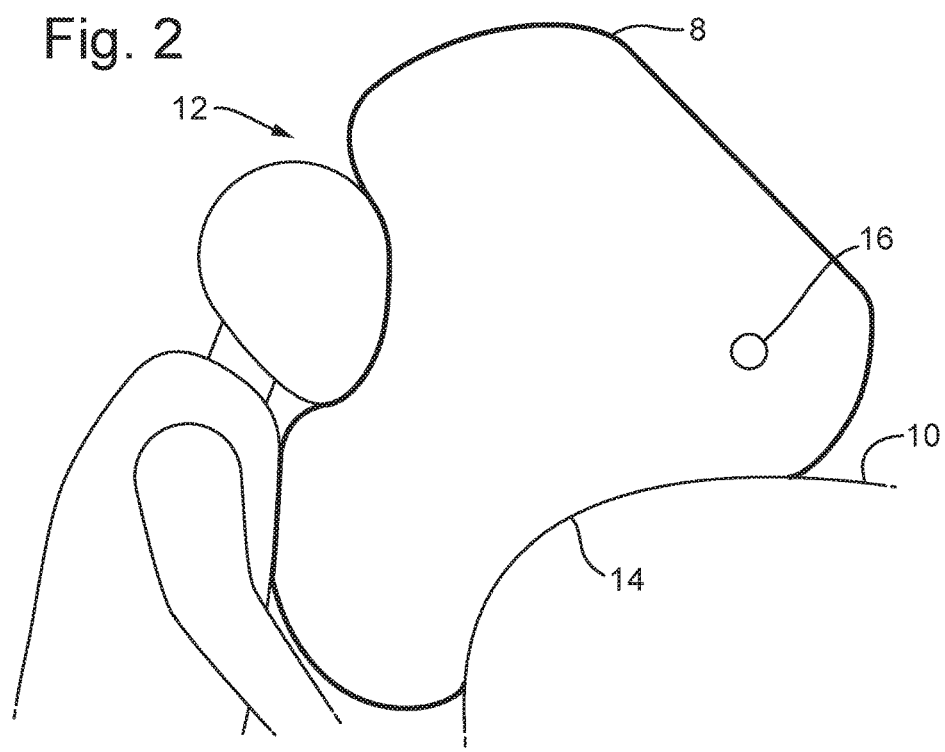
FIG. 2 shows a previously proposed airbag system for a vehicle, during an initial impact with an occupant.

FIG. 2 shows a previously proposed airbag in an inflated state. As depicted, when the airbag has been inflated, the airbag forms a cushion 12 which extends over a surface of the vehicle, e.g. the dashboard 10, in order to cushion an impact between an occupant of the vehicle and the surface of the vehicle. The airbag 8 comprises an attachment portion 14 which remains coupled to the inflator 6 and/or the dashboard 10. The airbag may also comprise one or more vents 16, which allow gas to leave the airbag following inflation. The vents 16 may be configured to direct any gases leaving the airbag away from the occupant.

Following initial inflation, the cushion 12 of the airbag 8 may be inflated to a pressure, which may result in a substantially constant surface tension in the surface of the cushion. When the passenger impacts the cushion, the cushion may be deformed, e.g. compressed, by the occupant which may increase the pressure of the cushion 12, and/or the surface tension of the airbag. Pressure in the cushion may continue to rise during the impact until the occupant is fully cushioned and a peak pressure is reached. Gas may be vented from the airbag 8 via the one or more vents 16 following inflation, which may gradually reduce the pressure in the airbag 8. The initial inflation pressure of the airbag and the rate of venting of the gas, through the one or more vents 16, may be set in order to provide the most effective cushioning for the occupant.

Figure 3:
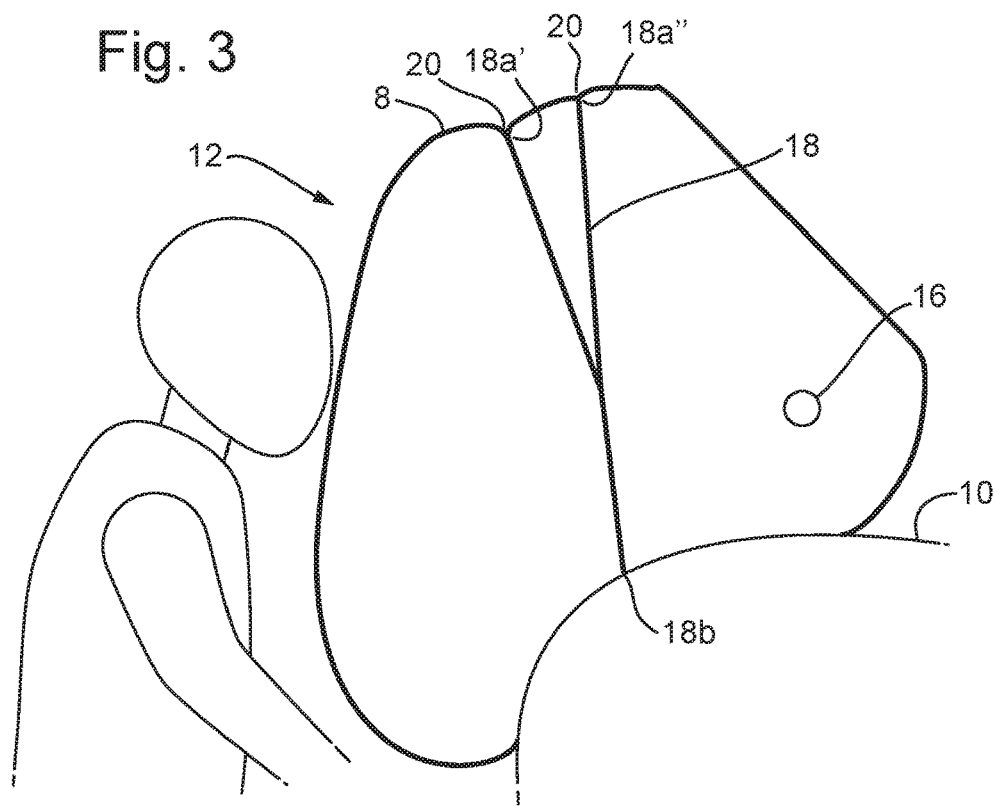
FIG. 3 shows a sectional view of an airbag system for a vehicle, according to an arrangement of the present disclosure after deployment of the airbag and before an initial impact with an occupant.

With reference to FIG. 3, an airbag system according to an arrangement of the present disclosure may comprise one or more tethers 18. The tethers 18 may be provided inside the airbag 8, e.g. the tethers 18 may be internal to the airbag 8. The tethers 18 may be formed from the same material as the outer wall of the airbag 8. Each tether may be coupled, at a first end 18a of the tether, to the outer wall of the airbag 8. Each tether may be coupled, at a second end 18b of the tether, to the inflator 6. Additionally or alternatively, each second end of the tether may be coupled to another location on the outer wall of the airbag, and/or to the surface of the vehicle in which the airbag is installed, e.g. the dashboard 10. The tethers may comprise more than one second end which may be coupled to any combination of the outer wall, inflator or surface of the vehicle.

When the airbag is inflated, the tethers 18 may be put under tension. The tethers may carry a portion of the tension from the outer wall of the airbag to the inflator 6 and/or to another portion of the outer wall of the airbag. The tension in the outer wall of the airbag at or near the position of the first ends 18a of the tethers may therefore be reduced.

One or more pleats 20 may be formed in the outer wall of the airbag 8 by the one or more tethers 18 when the airbag is inflated, e.g. fully inflated. The length and/or position of each tether 18 may be configured such that the location at which the first end 18a of the tether is coupled to the outer wall of the airbag is pulled inwards in the direction of the tether 18, e.g. towards the second end of the tether. In other words, the tether 18 may pull the outer wall of the airbag such that the distance between the locations on the airbag, where the first and second ends of the tether are coupled, is shorter than it would be otherwise, if the tether was not provided. The pleats may therefore be formed without any securing means, such as stitching or adhesive, being provided across the pleat to secure the pleat in place. The length and/or position of the tether may be configured such that the airbag is prevented from expanding into a configuration in which the volume of the airbag is maximised.

A trough of each of the pleats 20 may be defined as the location on the pleat where the deflection of the outer wall of the airbag, due to the tether, is at a maximum. The trough of the pleats may be formed at the locations where the first ends of the one or more tethers are coupled to the outer wall of the airbag.

The points at which the first ends of the tethers are coupled to the outer wall of the airbag may be positioned such that the pleats 20 are formed in a location on the airbag where the pleats unfold, e.g. partially or fully unfold, during an impact between the occupant of the vehicle and the airbag. The pleated region may be spaced apart from an impact region of the airbag that the occupant is intended to impact. As the occupant impacts the airbag, the airbag is compressed in a first direction and material may be pulled from the pleated region so as to unfold the pleats. Tension in the tethers may be reduced as the pleats unfold. The tension in the outer wall of the airbag at and/or near the location of the pleats may be reduced during an initial period of the impact between an occupant of the vehicle and the airbag.

Figure 4A:
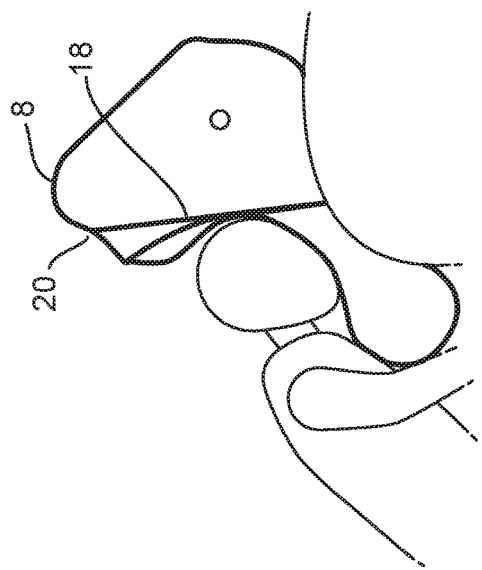
FIGS. 4A, 4B and 4C show a sectional view of an airbag system for a vehicle, according to an arrangement of the present disclosure, at increasing periods of time following an impact with an occupant of the vehicle.
Figure 4B:
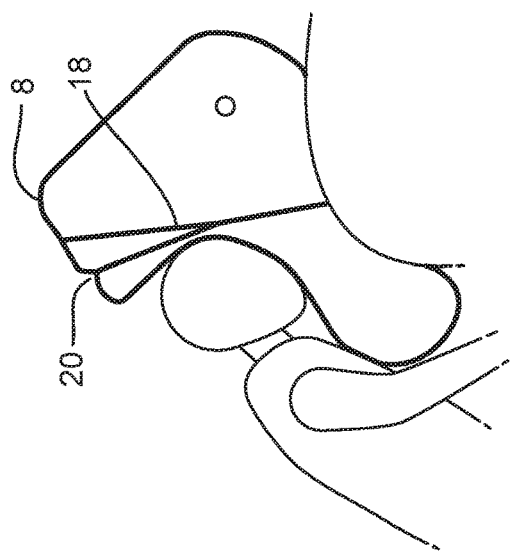
Figure 4C:
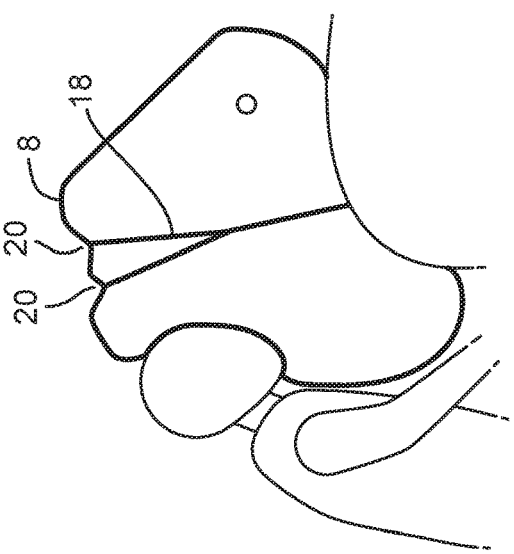

With reference to FIGS. 4a, 4b and 4c the airbag system 2 is shown at increasing periods of time following an impact with an occupant of the vehicle. In FIG. 4a, which depicts the airbag system immediately after the impact, two pleats are present in the outer wall of the airbag. In FIG. 4b, which depicts the airbag system a short period of time after the impact, it can be seen that one of the pleats, nearest the position at which the head of the occupant has impacted the airbag 8, has unfolded from the outer wall. In FIG. 4c, which depicts the airbag system a longer period of time after the impact, it can be seen that the second pleat is now substantially unfolded. Whilst the pleats in the outer wall are unfolding, the tension in the outer wall at and/or near the location of the pleats may be reduced.

In the arrangement shown in FIGS. 4a-4c, the tethers 18 are coupled to the outer wall of the airbag 8 at a location above the position at which the head of the occupant may be expected to impact the airbag during a collision. The tethers 18 are configured such that the pleats 20 are also located above this position. The presence of the tethers 18 and/or pleats 20 may therefore reduce the tension in the outer wall of the airbag 8 at and/or above the position at which the head of the occupant may be expected to impact the airbag 8. It is also envisaged that the tethers 18 and/or pleats 20 may be provided in any other location on the outer wall of the airbag 8, and/or may reduce the tension in a different portion of the outer wall.

The position of the tethers may be configured such the tension in the outer wall of the airbag is lowest at or above the position where the head of a smaller occupant, for example a female occupant in the $5^{th}$ percentile of height according to New Car Assessment Program (NCAP) testing procedure, would impact the airbag 8.

When the tethers 18 are configured in this way, the reduced tension in the surface of the airbag may encourage an occupant impacting the airbag and/or the head of the occupant to rotate forwards, e.g. such that the occupant's forehead moves forwards relative to their chin. Rotating in this way may encourage flexion of the neck of the occupant rather than extension, which may reduce neck extension injuries.

The one or more tethers 18 may be bifurcated and comprise two first ends 18a' 18a". For example, as shown in FIG. 3, the one or more tethers may be substantially Y-shaped. Alternatively, the one or more tethers may comprise three or more first ends 18a.

Each of the first ends 18a of the tethers 18 may be coupled to the outer wall of the airbag. As shown in FIG. 3, one of the first ends of the tether is coupled to the airbag at a position that is lower than the other first end once the airbag has been inflated, e.g. the first ends may be coupled at vertically offset positions. This configuration may form two pleats on the outer wall of the airbag 8.

Additionally or alternatively to being coupled at vertically offset positions, the first ends of the tethers may be coupled to the outer wall of the airbag at positions which are laterally offset from one another. This may increase the lateral length of the pleat in the outer wall of the airbag and/or may extend the area of the outer wall, in which the tension is reduced, in the lateral direction.

Additional tethers may be provided within the airbag assembly, which may be coupled to the outer wall of the airbag at different positions. The additional tethers may form additional pleats. For example, rather than providing the Y-shaped tether shown in FIG. 3, two tethers may be provided that form a V-shaped arrangement of tethers. This alternative arrangement of tethers may be configured to form substantially the same arrangement of pleats. The first ends of the additional tethers may couple to the outer wall of the airbag 8 at higher or lower positions than the first ends of other tethers. Additionally or alternatively, the locations at which the first ends of the tethers are coupled to the outer wall of the airbag 8 may be laterally offset.

In other arrangements, not shown, additional tethers and/or additional first ends of tethers may be included which may form additional pleats and/or extend the lateral length of the pleats. For example, in one arrangement, three or more tethers may be provided which may form three or more pleats in the outer wall of the airbag.

During an impact between an occupant of the vehicle and the airbag 8, the airbag may be compressed. The pressure in the airbag and/or the tension in the surface may increase due to the compression of the airbag. Unfolding of the pleats, may reduce the pressure and/or tension compared to what it would have been otherwise. For example, the unfolding of the pleats may reduce the rate of increase in pressure and/or tension during the collision.

Once the pleats have become unfolded, e.g. substantially fully or completely unfolded, the increase in pressure and/or tension in the airbag may be substantially unaffected by the presence of the tethers 18. The peak pressure and/or tension in the airbag during the collision may be substantially unaffected by the presence of the pleats and/or tethers once the pleats have been unfolded. The peak pressure and/or tension may be configured such that a larger occupant, for example a $50^{th}$ Percentile male occupant, may be correctly cushioned by the airbag 8.

By providing the tethers 18 within the airbag assembly, as described above, an airbag may be provided that is configured to cushion both smaller and larger occupants without the use of multiple chambers within the airbag. The airbag 8 may therefore comprise a single chamber airbag. A single chamber airbag may be cheaper and easier to manufacture than an airbag comprising multiple chambers. However, it is equally envisaged that the tethers 18 may be provided within an airbag comprising two or more chambers, which may be inflated to the same or different pressures.

Figure 5:
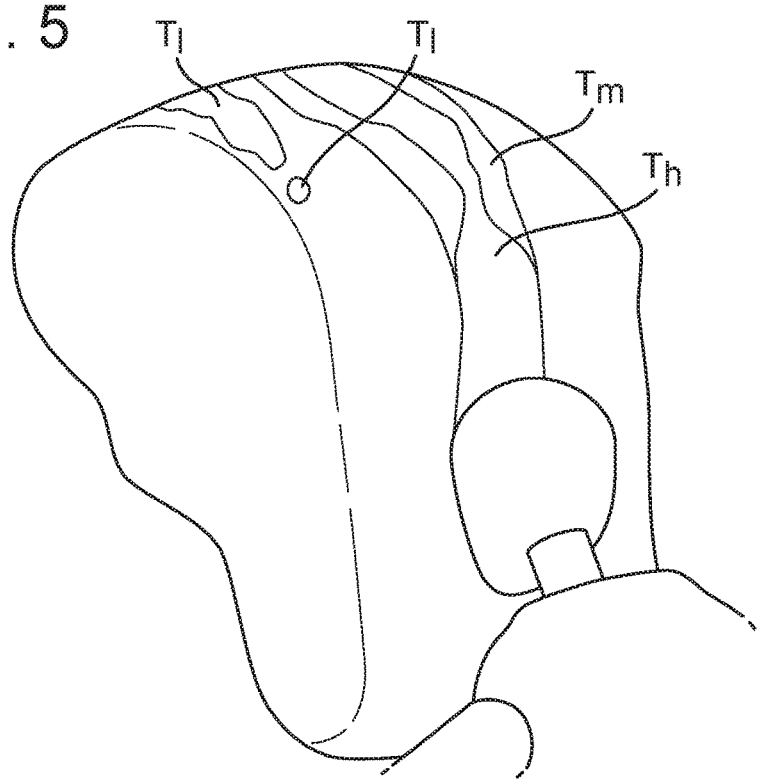
FIG. 5 is a view of a previously proposed airbag system with areas marked indicating the tension in the surface of the airbag, during an initial impact with an occupant.

With reference to FIG. 5, a previously proposed airbag system, which does not comprise a tether, is shown. In FIG. 5 areas are marked on the outer wall of the airbag to indicate the level of tension in the outer wall of the airbag in these areas. Areas indicated as $T_h$ represent areas of relatively high tension, areas indicated as $T_m$ have medium tension and areas indicated as $T_l$ are areas of relatively low tension. Areas that are not marked as high, medium or low tension may have a level of tension that is between the medium and low relative tension values.

Figure 6:
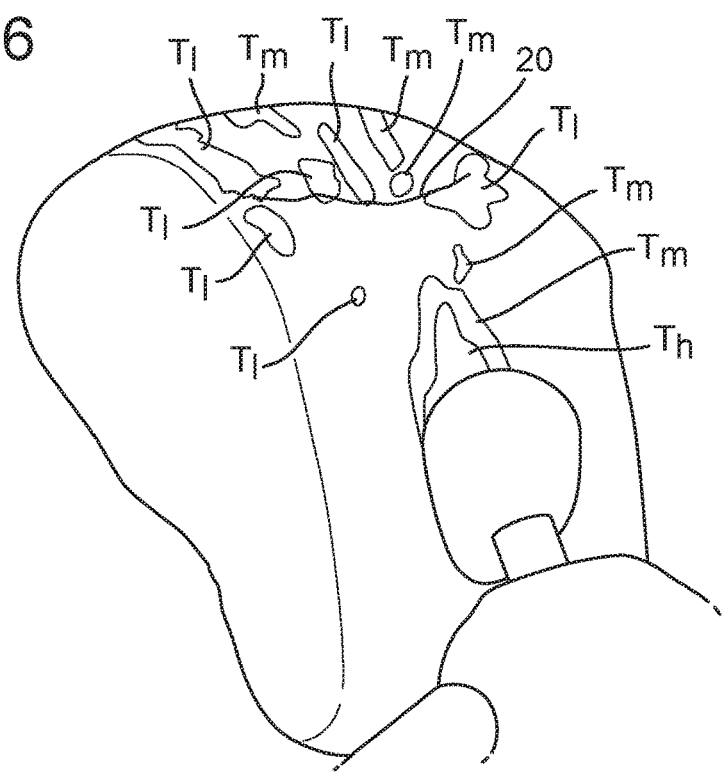
FIG. 6 is a view of an airbag system, according to an arrangement of the present disclosure, with areas marked indicating the tension in the surface of the airbag, during an initial impact with an occupant.

FIG. 6 depicts an airbag system 2, according to the present invention, which comprises a tether 18 forming a pleat 20. Areas are marked in FIG. 6, which indicate areas of high, medium and low relative tension in the outer wall of the airbag 8. It can be seen, by comparison between FIGS. 5 and 6, that the extent of the areas of high tension in the outer wall of the airbag 8, at and above the position at which the head of the occupant impacts the airbag 8, is reduced when the tether 18 is provided within the airbag system 2.

The absolute values of the tension in the high, medium and low tension areas may be reduced in the airbag comprising the tether 18, as shown in FIG. 6, compared to the airbag, which does not comprise the tether 18, shown in FIG. 5.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag assembly for a vehicle comprising:
   an airbag including a tether and an inflator to inflate the airbag when deployed;
   wherein the tether is coupled to an outer wall of the airbag at a bifurcated first end of the tether, the tether being configured to form a pleat in the outer wall of the airbag when the airbag is fully inflated;
   wherein the tether is coupled to the outer wall at a location such that the pleat at least partially unfolds during an impact between an occupant of the vehicle and the airbag; and
   wherein, via unfolding the pleat, tension in a portion of the outer wall of the airbag is reduced when inflated and during an initial period of an impact between an occupant of the vehicle and the airbag.

2. The airbag assembly of claim 1, wherein the pleat is formed on the airbag above a location where a head of the occupant of the vehicle impacts the airbag.

3. The airbag assembly of claim 1, wherein the pleat forms a trough at the location where the first end of the tether is coupled to the outer wall of the airbag.

4. The airbag assembly of claim 2, wherein the tether is configured to reduce the tension in the portion of the outer wall of the airbag at the location at which the head of the occupant of the vehicle impacts the airbag.

5. The airbag assembly of claim 1, wherein the tether is coupled to the airbag assembly at a second end of the tether.

6. The airbag assembly of claim 1, wherein the tether is coupled to the inflator at a second end of the tether.

7. The airbag assembly of claim 1, wherein the tether defines a length configured such that the outer wall of the airbag at the first end of the tether is pulled inwards toward a second end of the tether to form the pleat.

8. The airbag assembly of claim 1, wherein the tether includes two or more first ends coupled to the outer wall of the airbag at two or more positions.

9. The airbag assembly of claim 8, wherein one of the positions is lower than another of the positions when the airbag is inflated.

10. The airbag assembly of claim 8, wherein one of the positions is laterally offset from another of the positions when the airbag is inflated.

11. The airbag assembly of claim 1, wherein the tether is formed from substantially the same material as the outer wall of the airbag.

12. The airbag assembly according to claim 1, wherein a peak tension of a surface of the airbag during an impact is substantially unaffected by the pleat by unfolding of the pleat.

13. The airbag assembly according to claim 1, wherein the pleat is configured to cause, via unfolding of the pleat, a head of the occupant of the vehicle impacting the airbag to rotate forwards.

14. The airbag assembly according to claim 1, wherein the pleat is configured to reduce, via unfolding, extension of a neck of the occupant during an impact.

15. The airbag assembly of claim 1, wherein the airbag comprises a single chamber airbag.

16. A vehicle comprising:
   an airbag assembly including an inflator and an airbag having an outer wall; and
   a tether including a bifurcated first end coupled to the outer wall at two locations on the outer wall such that the tether defines a trough at the locations to form a pleat, wherein the pleat is configured to unfold at the trough in response to an impact with the airbag.

17. The vehicle of claim 16, wherein the bifurcated first end of the tether defines a substantial Y-shape to define the trough on the outer wall of the airbag.

18. An airbag comprising:
   an airbag chamber defining an outer wall and being configured to inflate via an inflator;
   a tether disposed with the airbag chamber and attached to the outer wall at a bifurcated first end and the inflator at a second end such that the outer wall defines a trough at a location defined by attachment at the first end; and
   a pleat formed on the outer wall at the trough such that, during impact with the airbag chamber, the pleat is configured to unfold at the trough.

19. The airbag of claim 18, wherein the first end of the tether is bifurcated such that the first end couples the outer wall and the inflator at a plurality of positions on the outer wall.

20. The airbag assembly of claim 9, wherein one of the positions is lower than another of the positions when the airbag is inflated.

* * * * *